Dec. 19, 1967   D. CORBETT-SMITH ET AL   3,359,041
APPARATUS FOR A LIQUID DISCHARGE OF LADING
Filed May 24, 1966   5 Sheets-Sheet 1

INVENTORS.
DONALD CORBETT-SMITH
WILLARD E. KEMP
BY *Eugene N. Riddle*
ATTORNEY

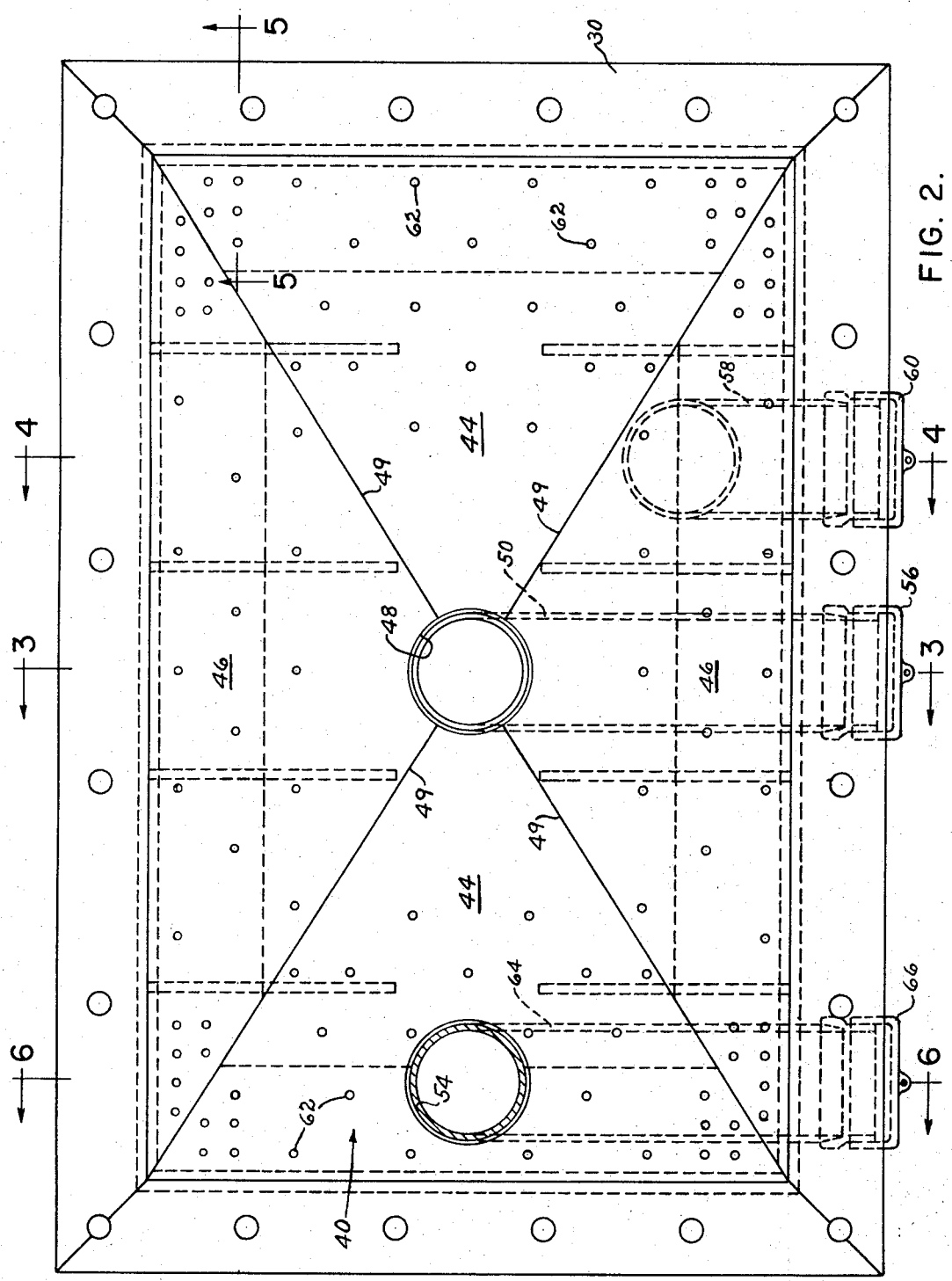

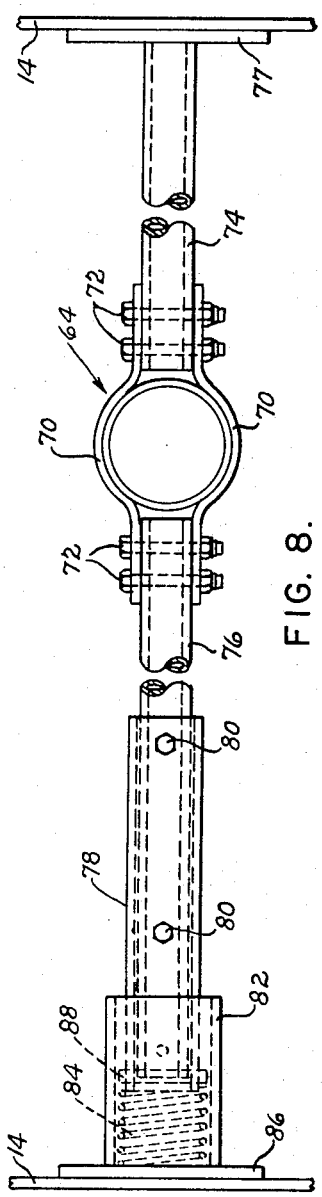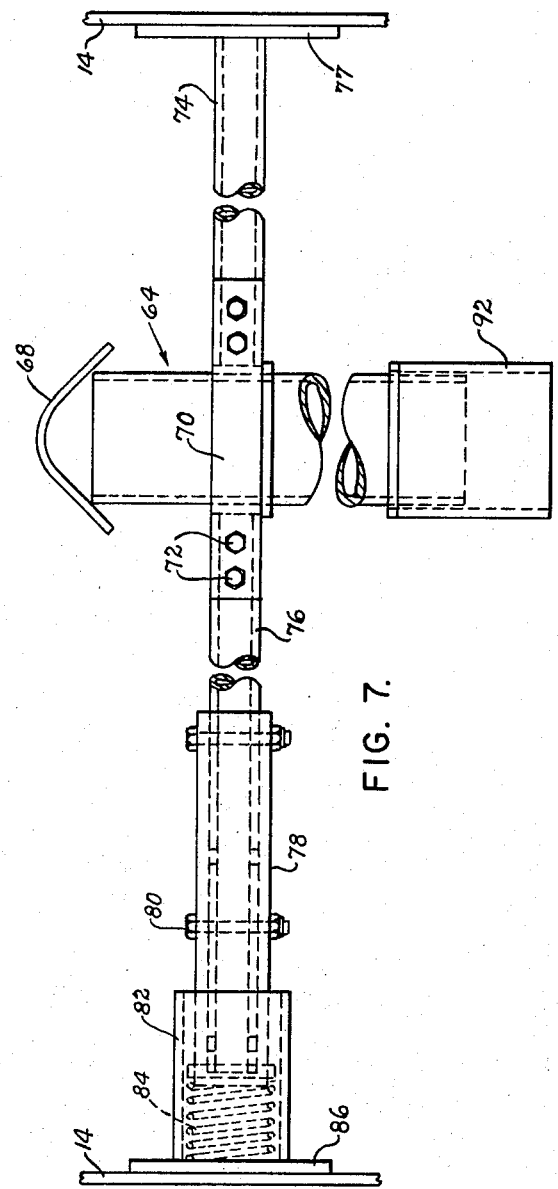

Dec. 19, 1967   D. CORBETT-SMITH ET AL   3,359,041
APPARATUS FOR A LIQUID DISCHARGE OF LADING
Filed May 24, 1966   5 Sheets-Sheet 5

United States Patent Office 3,359,041
Patented Dec. 19, 1967

3,359,041
APPARATUS FOR A LIQUID DISCHARGE OF LADING
Donald Corbett-Smith, St. Charles, and Willard E. Kemp, Bridgeton, Mo., assignors to ACF Industries, Incorporated, New York, N.Y., a corporation of New Jersey
Filed May 24, 1966, Ser. No. 552,545
12 Claims. (Cl. 302—16)

ABSTRACT OF THE DISCLOSURE

A railway hopper car having a bottom discharge outlet for discharging a mixture of liquid and particulate material, selectively, either in a solution or a slurry. The discharge outlet has a liquid inlet pipe for supplying liquid under pressure to the associated hopper and a pair of discharge outlets, one discharge outlet extending to the upper portion of the hopper for the solution discharge and the other discharge outlet being in the lower portion of the hopper for the slurry discharge.

---

Heretofore, it has been common to provide a carrier liquid to discharge and convey particulate solid material from a hopper structure in the form of a slurry or a solution. Normally, a plurality of pipes had been placed within the hopper structure adjacent the dry particulate material with a plurality of openings in the pipes through which jets or streams of water from the pipes are injected into the adjacent material to form a slurry or solution for discharge from a discharge pipe. Such prior constructions required that the pipes and connections be mounted within the hopper structure which required a substantial length of pipe about the hopper as well as being burdensome and time consuming in securing the pipes to the adjacent hopper sides. Pipes within the hopper structure also tend the obstruct or hinder the flow of material from the hopper and material tends to bridge over certain areas of the pipes.

The present invention is directed to a bottom outlet structure which may be easily secured, such as by bolting or welding, beneath a hopper structure. In some instances, a hopper structure may be employed only temporarily in a slurry or solution type of discharge and it is sometimes desirable to modify an existing hopper structure for such slurry unloading. Thus, it is highly desirable to have an arrangement, such as the present outlet structure, which may be easily installed and removed from a hopper structure. The outlet structure comprises a liquid pressure chamber having an inlet connected thereto for supplying liquid under pressure to the pressure chamber, an upper plate forming at least a portion of the upper wall of the pressure chamber and having an upper material supporting surface on which particulate material is supported, the upper plate having a plurality of perforations thereon of a relatively small size sufficient to permit a stream of liquid to jet from the liquid pressure chamber into the superjacent particulate material to form a mixture of liquid and particulate material, and a discharge conduit to receive the mixture of liquid and particulate material to unload the mixture. The hopper structure may be unloaded, selectively, from a discharge conduit at the bottom of the hopper structure in which the mixture is usually in a slurry form, or from a discharge conduit adjacent the upper portion of the hopper structure in which the mixture overflows into the conduit in a solution form.

Other features of this invention include a removable discharge conduit adapted to be positioned within the hopper structure to unload the mixture of liquid and particulate material from the upper portion of the hopper structure. Also, means may be provided to control the amount of liquid in the mixture of liquid and particulate material being discharged from the hopper structure.

The invention accordingly comprises the constructions hereinafter described, the scope of the invention being indicated in the following claims.

In the accompanying drawings, in which several of various possible embodiments of the invention are illustrated, FIGURE 1 is a side elevation of a railway hopper car having a plurality of hopper structures with bottom outlet structures secured thereto comprising the present invention;

FIGURE 2 is a top plan of one of the bottom outlet structures shown in FIGURE 1;

FIGURE 7 is a side elevation of the support means for the outlet conduit shown partially in FIGURE 6 and illustrating the upper portion of the outlet pipe within a hopper structure for discharging a mixture of liquid and particulate material from the upper portion of the hopper structure;

FIGURE 8 is a top plan of the support means shown in FIGURE 7;

Figure 10:
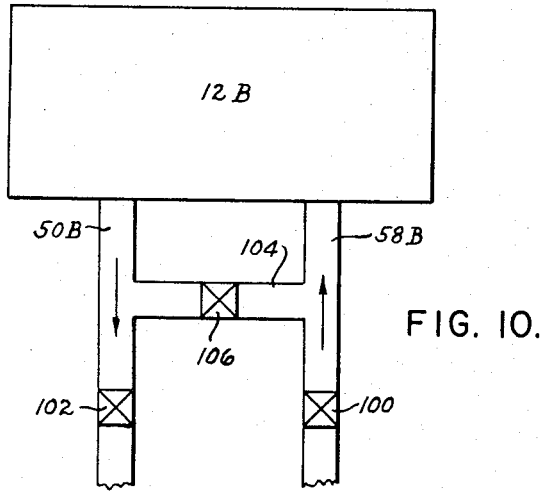
Figure 11:
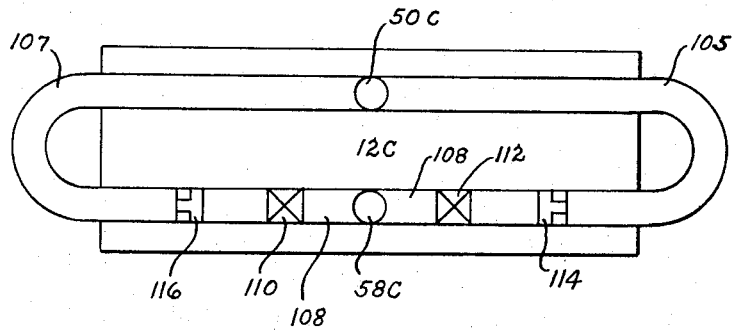

FIGURE 10 is a schematic of a modified piping arrangement to dilute the concentration of the particulate material in the mixture being discharged from the hopper structure; and FIGURE 11 is a schematic of a further piping arrangement to vary the concentration of particulate material in the mixture being discharged from the hopper structure and adapted to be employed from either side of a railway hopper car.

Corresponding reference characters indicate corresponding parts throughout the several views of the drawings.

Figure 1:
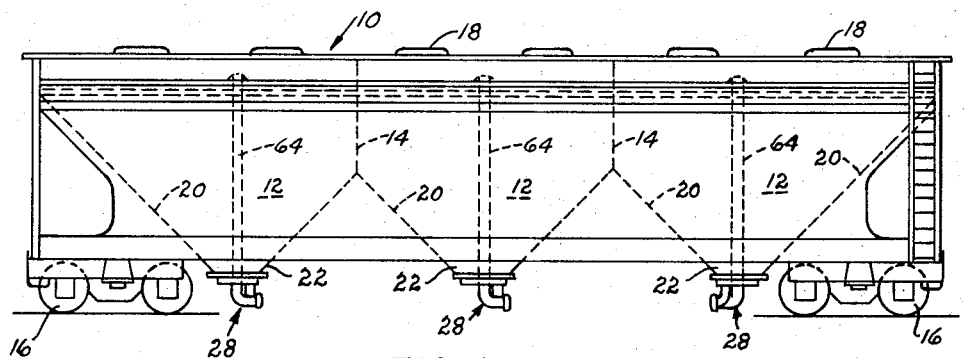
Figure 3:
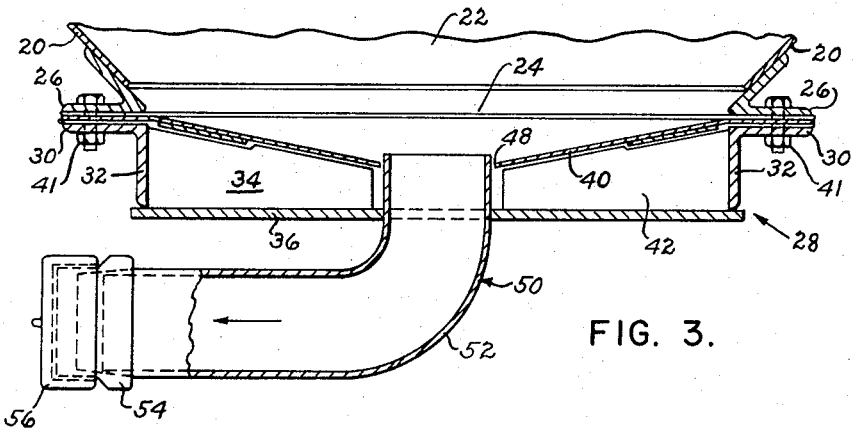
FIGURE 3 is a section taken generally along line 3—3 of FIGURE 2 and showing the discharge conduit for discharging a mixture of liquid and particulate material from the bottom of the bottom outlet structure.
Figure 4:
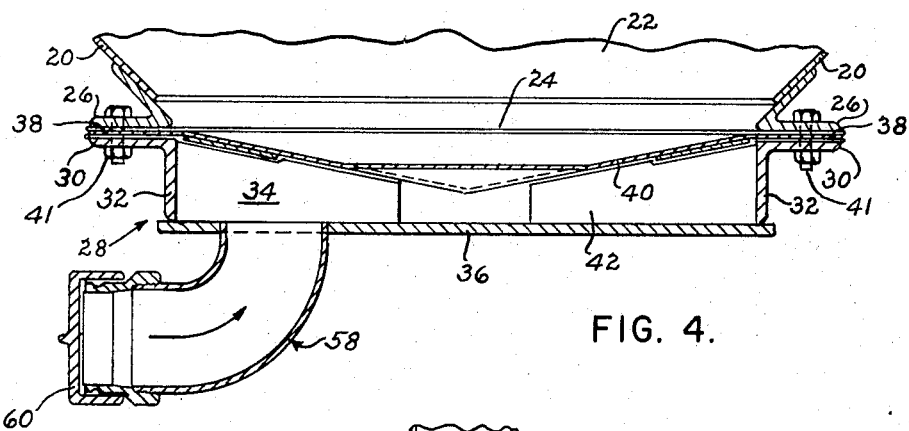
FIGURE 4 is a section taken generally along line 4—4 of FIGURE 2 and showing the liquid inlet pipe for the bottom outlet structure.

Referring now to the drawings and more particularly to FIGURE 1, a covered hopper car is indicated generally 10 and has a plurality of hopper structures 12 separated by partitions or bulkheads 14. A truck assembly 16 is arranged at each end of car 10. Spaced along the top of car 10 are hatch covers 18 for loading the car with particulate material which is adapted to be mixed with a liquid and unloaded in a slurry or solution form. Examples of such particulate materials are sodium chlorate, potassium carbonate, titanium dioxide, potassium chloride and sodium nitrate. Hopper sheets 20 and 22 slope downwardly to a bottom opening 24 as shown in FIGURES 3 and 4. A peripheral outer flange 26 extends about each opening 24.

Mounted beneath each hopper structure 12 is a bottom outlet structure generally indicated 28. Each bottom outlet structure 28 is generally identical and comprises an outer peripheral flange 30 extending outwardly about the periphery of a generally rectangular frame formed by side walls 32 and connected end walls 34. A bottom wall 36 is secured, such as by welding, to the lower edges of sides or walls 32 and 34. Secured between peripheral flanges 26 and 30 along a marginal portion 38 is an upper perforated plate generally indicated 40. Suitable nut and bolt combinations 41 secure flanges 26 and 30 together. A liquid pressure chamber 42 is formed between lower wall 36 and upper perforated plate 40. Plate 40 as shown in FIGURE 2 is formed in pairs of opposed sections 44 and 46 which slope downwardly at a relatively small slope to a central opening 48. Sections 44 and 46 have adjacent edges welded together along seams 49.

Mounted within central opening 48 as shown in FIGURE 3 is an outlet discharge pipe generally indicated 50 and having an elbow 52. Pipe 50 terminates in a threaded fitting 54 having a removable cap 56 threaded thereon. The outside diameter of outlet 50 is smaller than the adjacent peripheral edge defining opening 48 and is spaced therefrom a distance of around ⅛ inch. This permits plate 40 to flex slightly when liquid pressures increase within liquid chamber 34. Thus, discharge outlet pipe 50 is unsecured to perforated plate 40.

As shown in FIGURE 4, a water or liquid inlet pipe or conduit 58 is connected to bottom wall 36 and supplies liquid, such as water, to liquid chamber 42. A removable cap 60 threaded on the end of inlet pipe 58 may be removed for connection of inlet pipe 58 with a liquid supply pipe (not shown) to a suitable source of water or the like.

Figure 5:
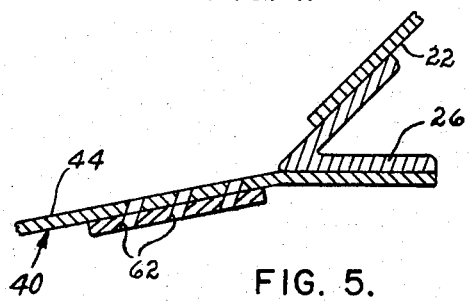
FIGURE 5 is an enlarged partial section taken generally along line 5—5 of FIGURE 2 and showing the perforated plate defining the upper wall of the liquid chamber and illustrating the perforations disposed adjacent a corner of the hopper structure.
Figure 9:
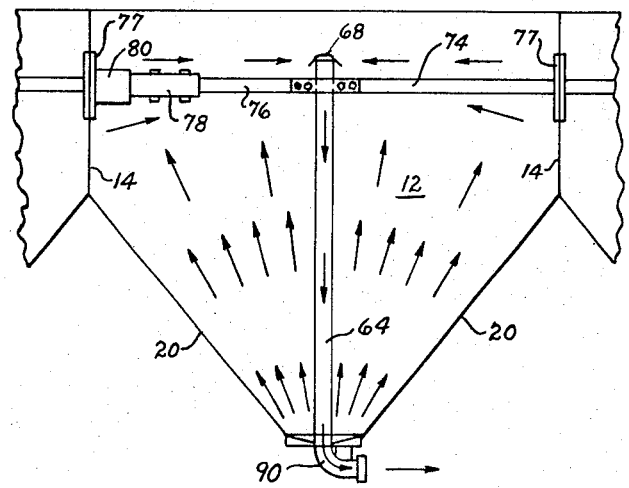
FIGURE 9 is a side elevation, partly diagrammatic, illustrating the discharge from the upper portion of the hopper structure.

Plate 40 has a plurality of perforations 62. It is noted that perforations 62 are closely spaced adjacent the corners of the bottom outlet structure 28. Further, referring to FIGURE 5, the longitudinal axes of perforations 62 which are positioned adjacent the hopper walls 22 are disposed at an angle of around twenty-five degrees (25°) with respect to the vertical plane and generally parallel to or directed toward the adjacent hopper side. This permits the liquid or the like to jet onto the hopper sides adjacent the corners of the bottom outlet structure for removing any lading which might be adhering to the surface of hopper sides 20 and 22. It is desirable that the liquid jetting upwardly from perforations 62 jet or spray upwardly a sufficient distance to wet as much adjacent lading as possible. To provide a sufficient pressure within chamber 42 to jet the water upwardly in a spray or stream, the entire area of all the perforations 62 is preferably generally equal to the area of inlet pipe 58 for best results. For example, when employing a liquid supply pipe (not shown) or an inlet pipe 58 having a diameter of around four (4) inches a cross-sectional area of around twelve (12) square inches is provided. Thus, the surface area of all perforations 62 would approximate around twelve (12) square inches in order to obtain optimum results with the spraying of the liquid. This would be around seven-tenths (.7) percent of the entire surface area of perforated plate 40. Satisfactory results may be obtained if the surface area of perforations 62 is less than around forty (40) square inches or less than three times the cross-sectional area of the liquid supply pipe. Inlet pipe 58 as illustrated is of the same diameter as the liquid supply pipe.

To discharge a hopper 12 filled with a particulate material, such as sodium chlorate, for example, in a slurry unloading from the bottom of hopper 12, cap 60 is removed from the liquid inlet pipe 58 and a suitable liquid line source (not shown) is connected thereto. Cap 56 is removed from discharge pipe 50 and a suitble discharge line (not shown) is connected to pipe 50. Liquid fills chamber 42 and is jetted upwardly through perforations 62 into the lading until the lading is saturated with the liquid rising to the upper portion of hopper 12. A water pressure in chamber 42 between around 50 p.s.i. and 90 p.s.i is adequate and with a hopper of around 1200 cubic feet filled with sodium chlorate, water would saturate the material within the entire hopper in around one hour. After the lading is saturated with water, the unloading from pipe 50 is commenced with a suitable pump connected to the discharge line. The supply of water to liquid chamber 42 from inlet pipe 58 is maintained during the unloading operation. The slurry or mixture of water and sodium chlorate is pumped from hopper 12 while the liquid inlet flow is maintained. Upon emptying of the car which may be determined from the concentration of sodium chlorate in the liquid carrier, water is permitted to jet upwardly and clean the sides of hopper 12. Then, the liquid inlet connection and the discharge outlet connection may be disconnected and caps 56 and 60 replaced.

Figure 6:
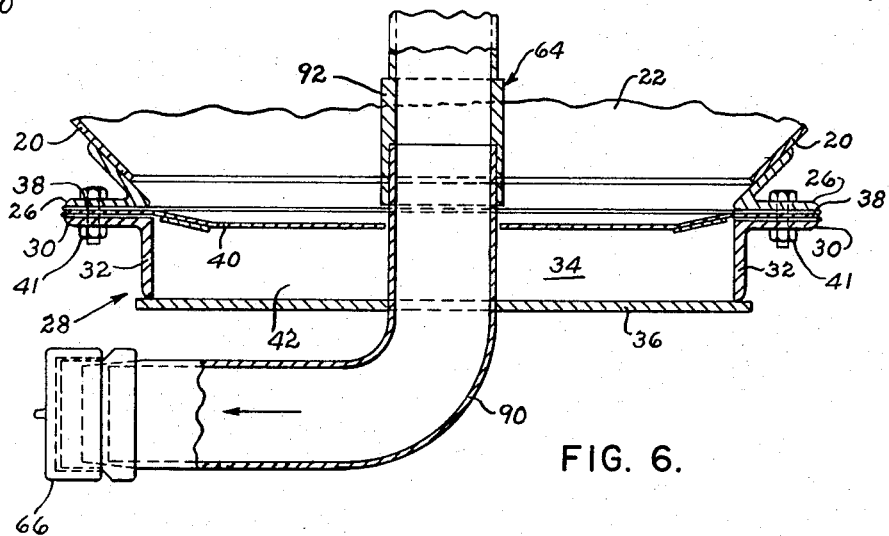
FIGURE 6 is a section taken generally along line 6—6 of FIGURE 2 and showing the discharge conduit for discharging from the upper portion of the hopper structure in a solution.

Each bottom outlet structure 28 is also adapted to discharge, selectively, from the upper portion of hopper 12 instead of draining or flowing from the bottom of hopper 12. To discharge or unload from the upper portion of hopper 12, such as in an unloading operation in which the particulate material dissolves in the liquid carrier to form a solution, an overflow pipe generally designated 64 is illustrated in FIGURES 6–9. The lower portion of discharge overflow pipe 64 is illustrated in FIGURE 6 while the upper portion of discharge pipe 64 is illustrated in FIGURES 7 and 8. Overflow pipe 64 extends through liquid chamber 42 and has a removable cap 66 which may be removed for connection of a suitable discharge line to overflow pipe 64. The upper end of pipe 64 has a cap or hood 68 with open ends to permit a mixture of liquid and lading to flow into the open upper end. Cap 68 minimizes any entry of particulate material into pipe 64 when the hopper 12 is being loaded. To support overflow pipe 64 within hopper 12, a pair of bands 70 extend about pipe 64 and are bolted with nut and bolt combinations 72 to opposed horizontal tubular supports 74 and 76. Support 74 has a plate 77 secured thereto and fitting in face-to-face relation with the adjacent hopper partition 14. Horizontal support 76 is secured to an enlarged diameter end portion 78 by bolts 80. End section 78 fits in sliding relation within a cylindrical housing 82. A coil spring 84 is mounted within cylindrical housing 82 and fits against a plate 86 disposed in face-to-face contact with the adjacent partition 14 and a retaining ring 88 secured to the end of section 78. Thus, spring 84 urges plates 77 and 86 into frictional contact with the adjacent hopper partitions 14 for maintaining conduit 64 in position within hopper 12. End cap 66 fits on a lower section 90 of overflow conduit 64. A fitting 92 fits over the extending end of lower section 90 to permit removal of the upper section of conduit 64 from lower section 90. To remove the upper section of pipe 64, housing 82 may be gripped and pipe 64 may be lifted from the extending end of lower section 90 as shown in FIGURE 6. If desired, fitting 92 could be fixed to lower section 90. Standpipe or overflow pipe 64 is particularly adapted for unloading particulate material which dissolves in the liquid to form a solution.

As an example and employing a dissolvable particulate material, such as sugar, a suitable water supply line is connected to water inlet 58 upon removal of cap 60. Water is introduced within liquid chamber 42 and fills hopper 12 to dissolve the particulate material. When the water or liquid reaches the upper end of overflow pipe 64, the solution flows into overflow pipe 64. A suitable discharge line is connected to lower section 90 upon removal of end cap 66 and the solution is pumped from hopper 12. When the solution falls below a predetermined concentration, the unloading operation is discontinued with the discharge line disconnected. Then, the remainder of the mixture within hopper 12 is discharged from the slurry outlet 50 upon connection of a suitable drain line after removal of cap 56.

Thus, the outlet structure shown in FIGURES 1–9 is adapted to be unloaded, selectively, from either the upper portion of hopper 12 from the vertical overflow pipe 64 in a solution form, or from a slurry outlet pipe 50 from the bottom of hopper 12. As shown in FIGURE 2, the slurry outlet pipe 50 is disposed within the center of outlet structure 28 while the overflow pipe is disposed adjacent an end of the bottom outlet structure.

It may be desirable to have an outlet structure with only one discharge nozzle. Upon removal of the upper section of overflow pipe 64, the mixture of particulate material and liquid may be discharged through the lower section 90. Thus, a single discharge conduit may be employed for unloading either from the upper section of hopper 12 with overflow pipe 64, or, upon removal of the upper section of overflow pipe 64 to discharge from lower section 90 from the bottom of hopper 12.

Referring to FIGURE 10, a diagrammatic view of a piping arrangement for diluting the concentration of the particulate material in the dicharge mixture is illustrated. Hopper 12B has a liquid inlet pipe 58B and a discharge pipe 50B for the discharge of the mixture of lading and particulate material from hopper 12B. Valves 100 and 102 are placed in lines 58B and 50B, respectively, to control the flow of to-and-from hopper 12B. A cross-connection 104 is provided between liquid inlet 58B and the product discharge 50B, and has a manual control valve 106 to permit, selectively, a flow of liquid directly in discharge line 50B thereby to bypass hopper 12B. Thus, the concentration of particulate material being discharged in outlet pipe 50B may be diluted.

Referring to FIGURE 11, a diagrammatic plan view illustrates a further modified piping arrangement in which hopper 12C is shown in plan with a liquid inlet pipe 58C and a product discharge line indicated at 50C. The discharge from line 50C may be from either side of the railway car with the amount of liquid in the discharge being varied. Discharge pipe 50C has flexible discharge hoses 105 and 107 connected thereto. Liquid inlet 58C has a stub connection 108 on either side thereof with adjacent control valves 110 and 112. A quick disconnect fitting 114 connects flexible hose 105 with stub connection 108. A quick disconnect fitting 116 connects flexible hose 107 with stub disconnection 108 on the other side of the railway car. If desired to unload from the right side of the railway car or the right side of hopper 12C viewing FIGURE 11, quick disconnect fitting 114 is disconnected and connected to a suitable discharge line for discharge. If it is desired to dilute the concentration of the discharge, valve 110 may be opened to permit liquid to flow from pipe 58C through flexible conduit 107 into conduit or flexible connection 105 thereby diluting the concentration of the product discharge.

In view of the above, it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. In apparatus for unloading substantially dry particulate material from a hopper structure having a plurality of connected hopper walls, a bottom outlet structure secured beneath said hopper structure to receive particulate material therefrom and having a liquid pressure chamber, a liquid inlet pipe connected to said pressure chamber for supplying liquid under pressure to said pressure chamber, an upper plate forming at least a portion of the upper wall of said liquid pressure chamber on which particulate material is supported, said upper plate having openings therein to permit a flow of liquid from the liquid pressure chamber into the superjacent particulate material to form a mixture of liquid and particulate material, said pressure chamber being filled with liquid upon the flow of liquid into the particulate material with a supply of liquid flowing into the pressure chamber from the inlet pipe, a first outlet conduit adjacent said plate adapted to receive the mixture of liquid and particulate material from the hopper structure to unload the mixture, a second outlet conduit spaced from said first outlet conduit and extending upwardly in the hopper structure through the liquid pressure chamber to a position above the upper plate and having a liquid entrance port adjacent its upper end to permit the entry of said mixture of liquid and particulate material, and means permitting a discharge of said mixture from either of said outlet conduits.

2. In apparatus for unloading substantially dry particulate material from a hopper structure having a plurality of connected hopper walls, a bottom outlet structure secured beneath said hopper structure to receive particulate material therefrom and having a liquid pressure chamber, a liquid inlet pipe connected to said pressure chamber for supplying liquid under pressure to said pressure chamber, an upper plate forming at least a portion of the upper wall of said liquid pressure chamber on which particulate material is supported, said upper plate having a plurality of perforations therein of a relatively small size sufficient to permit a stream of liquid to jet upwardly from the liquid pressure chamber through the perforations into the superjacent particulate material to form a mixture of liquid and particulate material, said pressure chamber being filled with liquid upon the jetting or liquid into the particulate material with a continuous supply of liquid flowing into the pressure chamber from the inlet pipe, the liquid jetting upwardly against the adjacent hopper walls after the particulate material has been unloaded to aid in clearing any adhering particulate material from the hopper walls, and an outlet conduit adjacent said plate and adapted to receive the mixture of liquid and particulate material from the hopper structure to unload the mixture, said plate having a relatively large generally central opening therein with said outlet conduit extending through said opening, the other diameter of said outlet conduit being slightly smaller than the diameter of said opening with the conduit being spaced inwardly slightly from the edge defining said opening, said plate being secured about its outer marginal portion to the hopper structure and being generally unrestrained inwardly of said outer marginal portion whereby a limited flexure of said plate relative to and adjacent said outlet conduit is permitted upon the exertion of a substantial liquid pressure within said liquid chamber.

3. In apparatus for unloading substantially dry particulate material from a hopper structure having a plurality of connected hopper walls, a bottom outlet structure secured beneath said hopper structure to receive particulate material therefrom and having a liquid pressure chamber, a liquid inlet pipe connected to said pressure chamber for supplying liquid under pressure to said pressure chamber, an upper plate forming at least a portion of the upper wall of said liquid pressure chamber on which particulate material is supported, said upper plate having a plurality of perforations therein of a relatively small size sufficient to permit a stream of liquid to jet upwardly from the liquid pressure chamber through the perforations into the superjacent particulate material to form a mixture of liquid and particulate material, said pressure chamber being filled with liquid upon the jetting of liquid into the particulate material with a continuous supply of liquid flowing into the pressure chamber from the inlet pipe, the liquid jetting upwardly against the adjacent hopper walls after the particulate material has been unloaded to aid in clearing any adhering particulate material from the hopper walls, and an outlet conduit adjacent said plate and adapted to receive the mixture of liquid and particulate material from the hopper structure to unload the mixture, said outlet conduit including a generally vertical discharge pipe extending upwardly from said plate to the upper portion of the hopper structure and having a liquid entrance port adjacent the upper end thereof to permit the entry of said mixture of liquid and particulate material.

4. In apparatus for unloading substantially dry particulate material from a hopper structure having a plurality of connected hopper walls, a bottom outlet structure secured beneath said hopper structure to receive particulate material therefrom and having a liquid pressure chamber, a liquid inlet pipe connected to said pressure chamber for supplying liquid under pressure to said pressure chamber, an upper plate forming at least a portion of the upper wall of said liquid pressure chamber on which particulate material is supported, said upper plate having a plurality of perforations therein of a relatively small size sufficient to permit a stream of liquid to jet upwardly from the liquid pressure chamber through the perforations into the superjacent particulate material to form a mixture of liquid and particulate material, said pressure chamber being filled with liquid upon the jetting of liquid into the particulate material with a continuous supply of liquid flowing into the pressure chamber from the inlet pipe, the liquid jetting upwardly against the adjacent hopper walls after the particulate material has been unloaded to aid in clearing any adhering particulate material from the hopper walls, a first outlet conduit adjacent said plate adapted to receive the mixture of liquid and particulate material from the hopper structure to unload the mixture, a second outlet conduit spaced laterally from the first outlet conduit and extending through the liquid pressure chamber upwardly to the upper portion of the hopper structure and having a liquid entrance port adjacent the upper end thereof to permit the entry of said mixture of liquid and particulate material, and means permitting, selectively, a discharge of said mixture from either of said outlet conduits.

5. In apparatus for unloading substantially dry particulate material from a hopper structure, a bottom outlet structure secured beneath said hopper structure to receive particulate material therefrom and having a liquid pressure chamber, a liquid inlet pipe connected to said pressure chamber for supplying liquid under pressure to said pressure chamber, an upper plate forming at least a portion of the upper wall of said pressure chamber on which particulate material is supported, said upper plate having a plurality of perforations therein of a relatively small size sufficient to permit a stream of liquid to jet from the liquid pressure chamber into the superjacent particulate material under a pressure sufficient to form a mixture of liquid and particulate material, said pressure chamber being filled with liquid upon the jetting of liquid into the particulate material with a continuous supply of liquid flowing into the pressure chamber from the inlet pipe, said plate having a relatively large opening therein, and a generally vertical discharge conduit within the opening extending through the liquid pressure chamber upwardly to the upper portion of the hopper structure and having a liquid entrance port adjacent the upper end thereof to permit the entry of said mixture of liquid and particulate material.

6. In apparatus for unloading substantially dry particulate material from a hopper structure as set forth in claim 5, said vertical discharge conduit being removably positioned within said hopper structure and unsecured to the hopper structure.

7. In apparatus for unloading substantially dry particulate material from a hopper structure having a plurality of connected hopper walls, a bottom outlet structure secured beneath said hopper structure to receive particulate material therefrom and having a liquid pressure chamber, a liquid inlet pipe connected to said pressure chamber for supplying liquid under pressure to said pressure chamber, an upper plate forming at least a portion of the upper wall of said pressure chamber and having an upper material supporting surface on which particulate material is supported, said upper plate having a plurality of perforations therein adjacent said hopper wall of a relatively small size sufficient to permit a stream of liquid to jet upwardly from the liquid pressure chamber through the perforations into the superjacent particulate material under a pressure sufficient to form a mixture of liquid and particulate material, said pressure chamber being filled with liquid upon the jetting of liquid into the particulate material with a substantially continuous supply of liquid flowing into the pressure chamber from the inlet pipe, a generally vertically extending outlet pipe positioned within the hopper structure and having a liquid entrance port adjacent the upper portion of the hopper to receive a mixture of liquid and particulate material, and a discharge conduit adjacent said plate and in fluid communication with the lower end of said outlet pipe to receive the mixture of liquid and particulate material therefrom.

8. In apparatus for unloading substantially dry particulate material from a hopper structure as set forth in claim 7, said hopper structure including a pair of opposed generally vertical walls, said outlet pipe being positioned between said walls within said hopper structure, and means connected to said outlet pipe extending to and continuously urged against the opposed walls with a force sufficient to position and maintain said outlet pipe in a substantially vertical position within the hopper structure, said means being unsecured to said opposed walls.

9. In apparatus for unloading substantially dry particulate material from a hopper structure as set forth in claim 8, said means connected to said outlet pipe comprising an elongate support secured to and extending horizontally outwardly from opposite sides of the pipe to the adjacent vertical walls, a plate secured to the extending end of each elongate support and fitting in face-to-face relation with the adjacent hopper wall, and spring means urging the plates into contact with the walls for maintaining said outlet pipe in position.

10. A railway hopper car having a plurality of hopper structures for carrying particulate material, each hopper structure having a bottom discharge opening, a bottom outlet structure secured beneath said discharge opening and having a liquid pressure chamber, a liquid inlet pipe connected to said pressure chamber for supplying liquid under pressure to said pressure chamber, an upper plate forming at least a portion of the upper wall of said pressure chamber and having an upper material supporting surface on which particulate material is supported, said upper plate having a liquid passageway therein to permit liquid to flow from the liquid pressure chamber into the superjacent particulate material to form a mixture of liquid and particulate material, said pressure chamber being filled with liquid upon the flow of liquid into the particulate material, a first discharge conduit in fluid communication with a discharge opening in said plate to receive the mixture of liquid and particulate material to unload the liquified mixture, a second discharge conduit spaced from said first discharge conduit and extending upwardly within the hopper structure to a position above the upper plate and having a liquid entrance port within the hopper structure to permit the entry of said mixture of liquid and particulate material, and means permitting a discharge of said mixture from either of said discharge conduits.

11. A railway hopper car having a plurality of hopper structures for carrying particulate material, each hopper structure having a bottom discharge opening, a bottom outlet structure secured beneath said discharge opening and having a liquid pressure chamber, a liquid inlet pipe connected to said pressure chamber for supplying liquid under pressure to said pressure chamber, an upper plate forming at least a portion of the upper wall of said pressure chamber and having an upper material supporting surface on which particulate material is supported, said upper plate having liquid passageways therein to permit liquid to flow from the liquid pressure chamber into the superjacent particulate material to form a mixture of liquid and particulate material, said pressure chamber being filled with the liquid upon the flow of liquid into the particulate material, said plate having a relatively large opening therein, a discharge conduit within said opening adapted to receive the mixture of liquid and particulate material to unload the liquified mixture, a cross conduit connecting said inlet pipe and said discharge conduit at a position upstream of the pressure chamber with respect to said inlet pipe, and valve means in said cross conduit to permit a controlled flow of liquid directly to said discharge conduit to increase the amount of liquid in the mixture of liquid and particulate material.

12. A railway hopper car having a plurality of hopper structures for carrying particulate material, each hopper structure having a bottom discharge opening, a bottom outlet structure secured beneath said discharge opening and having a liquid pressure chamber, a liquid inlet pipe connected to said pressure chamber for supplying liquid under pressure to said pressure chamber, an upper plate forming at least a portion of the upper wall of said pressure chamber and having an upper material supporting surface on which particulate material is supported, said upper plate having liquid passageways therein to permit liquid to flow from the liquid pressure chamber into the superjacent particulate material to form a mixture of liquid and particulate material, said pressure chamber being filled with liquid upon the flow of liquid into the particulate material, said plate having a relatively large opening therein, a discharge conduit within said opening adapted to receive the mixture of liquid and particulate material to unload the liquified mixture, a flexible conduit connected between said inlet pipe and said discharge conduit adjacent each side of the railway hopper car, valve means positioned in each flexible conduit to permit, selectively, a controlled flow of liquid directly to said discharge conduit to increase the amount of liquid in the mixture of liquid and particulate material, and a disconnectable fitting for each flexible conduit positioned downstream of the valve means for the associated flexible conduit with respect to the inlet pipe whereby a selected one of said flexible conduits may be employed for unloading from a predetermined side of the hopper car.

References Cited

UNITED STATES PATENTS

| | | | |
|---|---|---|---|
| 1,818,967 | 8/1931 | Allen | 302—15 |
| 2,732,071 | 1/1956 | Crow | 137—590 |
| 2,925,382 | 2/1960 | Kent et al. | 302—16 |
| 3,201,175 | 8/1965 | Keves et al. | 302—14 |

ANDRES H. NIELSEN, *Primary Examiner.*